(12) United States Patent
Kwak

(10) Patent No.: US 10,718,975 B2
(45) Date of Patent: Jul. 21, 2020

(54) BACKLIGHT UNIT WITH OPTICAL FILTER AND DISPLAY DEVICE INCLUDING THE SAME

(71) Applicant: LG Display Co., Ltd., Seoul (KR)

(72) Inventor: YoungJae Kwak, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/211,111

(22) Filed: Dec. 5, 2018

(65) Prior Publication Data

US 2019/0187517 A1 Jun. 20, 2019

(30) Foreign Application Priority Data

Dec. 20, 2017 (KR) .......................... 10-2017-0176352

(51) Int. Cl.
| | |
|---|---|
| G02F 1/1335 | (2006.01) |
| G02F 1/13357 | (2006.01) |
| F21V 8/00 | (2006.01) |
| G02B 5/26 | (2006.01) |
| G02B 5/28 | (2006.01) |

(52) U.S. Cl.
CPC ......... *G02F 1/133609* (2013.01); *G02B 5/26* (2013.01); *G02B 5/287* (2013.01); *G02B 6/0026* (2013.01); *G02F 1/133605* (2013.01); *G02F 1/133606* (2013.01); *G02F 1/133611* (2013.01); *G02F 1/133621* (2013.01); *G02F 1/133603* (2013.01); *G02F 2001/133607* (2013.01); *G02F 2001/133613* (2013.01); *G02F 2001/133614* (2013.01); *G02F 2203/055* (2013.01)

(58) Field of Classification Search
None
See application file for complete search history.

(56) References Cited

U.S. PATENT DOCUMENTS

| | | | | |
|---|---|---|---|---|
| 6,661,486 B1* | 12/2003 | Faris | ...................... | B82Y 15/00 349/115 |
| 2011/0199555 A1* | 8/2011 | Coe-Sullivan | ......... | G02B 6/005 349/62 |
| 2014/0176859 A1* | 6/2014 | Lin | ................... | G02F 1/133514 349/62 |
| 2016/0070047 A1* | 3/2016 | Okuyama | .............. | G02B 6/005 349/71 |
| 2019/0339433 A1* | 11/2019 | Benoit | ................. | G02B 5/3066 |

* cited by examiner

*Primary Examiner* — Evan P Dzierzynski
*Assistant Examiner* — Keith G. Delahoussaye
(74) *Attorney, Agent, or Firm* — Fenwick & West LLP

(57) ABSTRACT

A backlight unit includes an optical filter made of at least two or more filters. A first filter of the at least two or more filters reflects light within a first wavelength range, and a second filter of the at least two or more filters reflects light within a second wavelength range. The backlight unit has a structure that can prevent or reduce an effect on display performance, which would otherwise be caused by degradations in uniform color impression due to characteristics of light sources or a backlight structure.

20 Claims, 12 Drawing Sheets

(a) Prior Art (b)

BACKLIGHT UNIT WITH OPTICAL FILTER AND DISPLAY DEVICE INCLUDING THE SAME

CROSS REFERENCE TO RELATED APPLICATION

This application claims priority to Republic of Korea Patent Application No. 10-2017-0176352, filed on Dec. 20, 2017, which is hereby incorporated by reference for all purposes in its entirety.

BACKGROUND

Field of Disclosure

The present disclosure relates to a backlight unit and a display device including the same.

Description of Related Art

In response to the development of the information society, demand for a variety of display devices for displaying images is increasing. A range of display devices, such as liquid crystal display (LCD) devices, plasma display panel (PDP) devices, and organic light-emitting diode (OLED) display devices, have recently come into widespread use.

Among such display devices, an LCD device displays an image by allowing light provided by a backlight unit to pass through a display panel by adjusting the orientations of liquid crystals of a liquid crystal layer of the display panel by controlling an electric field applied to the liquid crystal layer.

Backlight units are categorized as direct backlight units, in which a light source is disposed below a display panel to directly irradiate light to the display panel, and edge-type backlight units, in which a light guide plate is disposed below a display panel and light is irradiated from a light source disposed on an edge of the light guide plate.

An image displayed on a specific region of the display panel may have different color impressions from those displayed on the other regions, due to the characteristics of the light source or the structure of the backlight unit. Such a difference in color impressions is one cause of degradations in display performance of the display device.

To reduce or remove different color impressions from a display panel, a variety of optical filters may be used. For example, an optical filter absorbing a wavelength of light that would generate a different color impression while allowing other wavelengths of light to pass therethrough may be used.

However, the light-absorbing optical filter may result in light loss due to the absorption of light, thereby lowering luminance of the display panel, which is problematic.

Accordingly, an improvement in the removal of different color impressions is necessary.

BRIEF SUMMARY

Various aspects of the present disclosure provide a backlight unit and a display device in which different color impressions in an image can be reduced.

Also provided are a backlight unit and a display device having improved display performance due to improved luminance uniformity of a display panel.

Also provided are a backlight unit and a display device in which an effect on display performance, caused by degradations in uniform color impression due to characteristics of light sources or a backlight structure, can be prevented or reduced.

The object of the present disclosure is not limited to the aforementioned description, and other objects not explicitly disclosed herein will be clearly understood by a person skilled in the art to which the present disclosure pertains from the description provided hereinafter.

In an aspect of the present disclosure, provided are a backlight unit and a display device having an optical filter allowing light within a specific wavelength range to pass therethrough while reflecting light within other wavelength ranges.

Also provided are a backlight unit and a display device having an optical filter provided between a diffusion layer and a color conversion layer.

Also provided are a backlight unit and a display device having an optical filter provided on one or more side surfaces of a light guide plate.

According to exemplary embodiments, display performance can be improved by removing or reducing different color impressions from an image displayed on the display panel.

In addition, according to exemplary embodiments, display performance can be improved by improving the luminance uniformity of the display panel.

Furthermore, according to exemplary embodiments, an effect on display performance, caused by degradations in uniform color impression due to characteristics of light sources or a backlight structure, can be prevented or reduced.

In an aspect of the present disclosure, provided is a backlight unit comprising a plurality of light sources, and an optical filter provided on a path of light from the plurality of light sources, the optical filter allowing light within a specific wavelength range to pass through while reflecting light within other wavelength ranges. The optical filter may comprise two or more filters, each of the two or more filters comprising two or more filter elements, each of the two or more filter elements comprising two or more polymer layers having different refractive indices, and the two or more filters including a first filter reflecting light within a first wavelength range and a second filter reflecting light within a second wavelength range.

In an aspect of the present disclosure, provided is a display device comprising a display panel and a back light unit providing light to the display panel. The backlight unit comprises a plurality of light sources, and an optical filter provided on a path of light from the plurality of light sources, the optical filter allowing light within a specific wavelength range to pass through while reflecting light within other wavelength ranges, wherein the optical filter comprises two or more filters, each of the two or more filters comprising two or more filter elements, each of the two or more filter elements comprising two or more polymer layers having different refractive indices, and the two or more filters include a first filter reflecting light within a first wavelength range and a second filter reflecting light within a second wavelength range.

In an aspect of the present disclosure, provided is a display device comprising a display panel, a color filter, a backlight unit providing light toward the display panel. The backlight unit comprises a plurality of light sources, and an optical filter provided on a path of light from the plurality of light sources, the optical filter including at least a first filter and a second filter each including at least four polymer layers, wherein the first filter is configured to reflect light of a first wavelength range toward the display panel and the second filter is configured to reflect light of a second wavelength range towards the display panel, the first filter and the second filter both configured to transmit light of a third wavelength range away from the display panel.

BRIEF DESCRIPTION

The above and other objects, features, and advantages of the present disclosure will be more clearly understood from the following detailed description when taken in conjunction with the accompanying drawings, in which.

DETAILED DESCRIPTION

Figure 1:
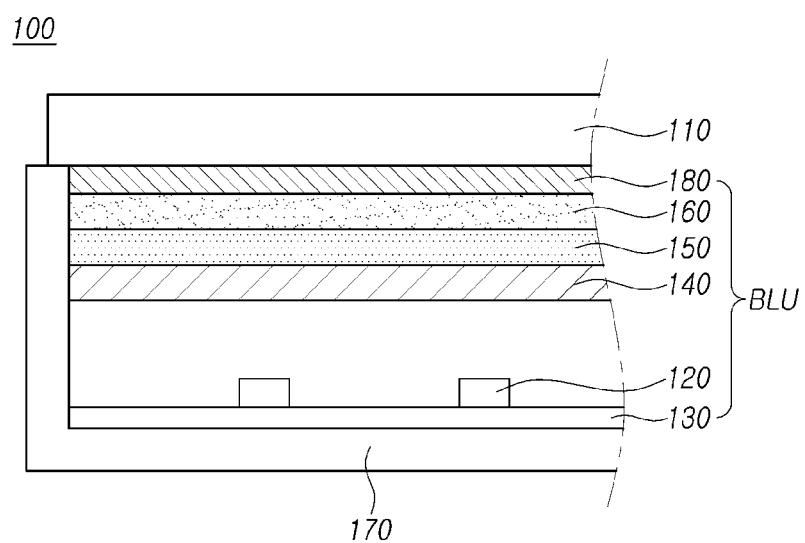
FIG. 1 is a cross-sectional view illustrating a display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly located on or under another element, but it can also be indirectly located on or under another element via an intervening element.

Figure 2:
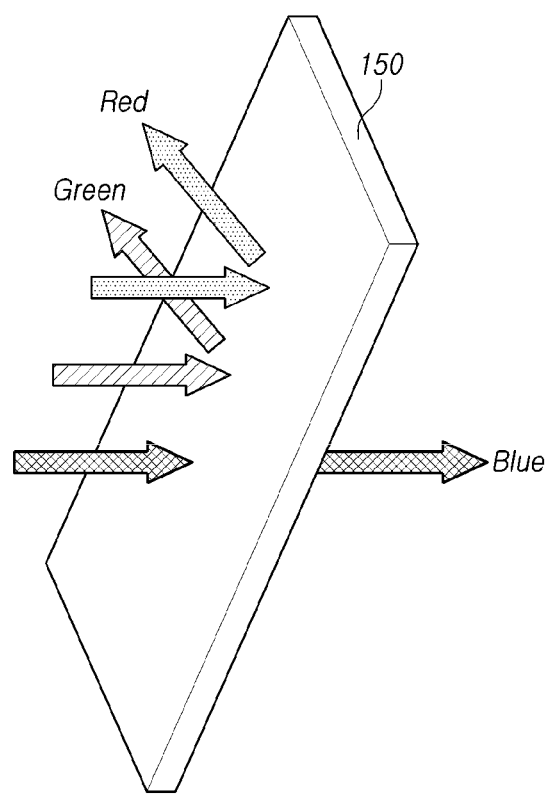
FIG. 2 is a schematic perspective view illustrating the optical filter of the display device according to exemplary embodiments.
Figure 3:
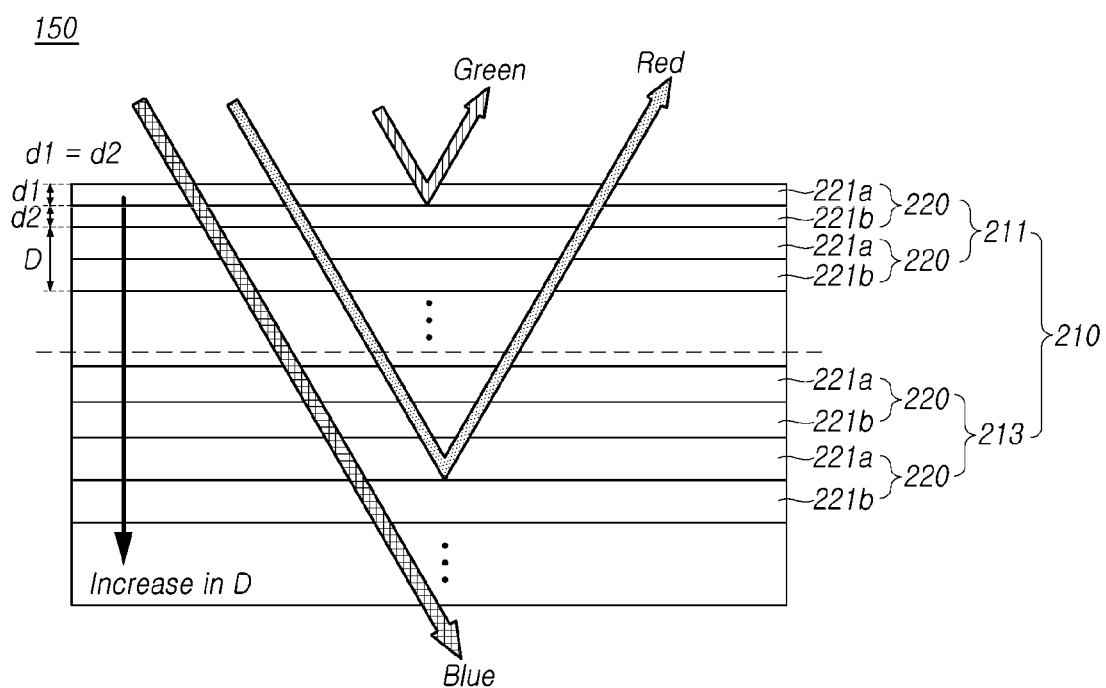
FIG. 3 is a schematic cross-sectional view illustrating an exemplary optical filter of the display device according to exemplary embodiments.
Figure 4:
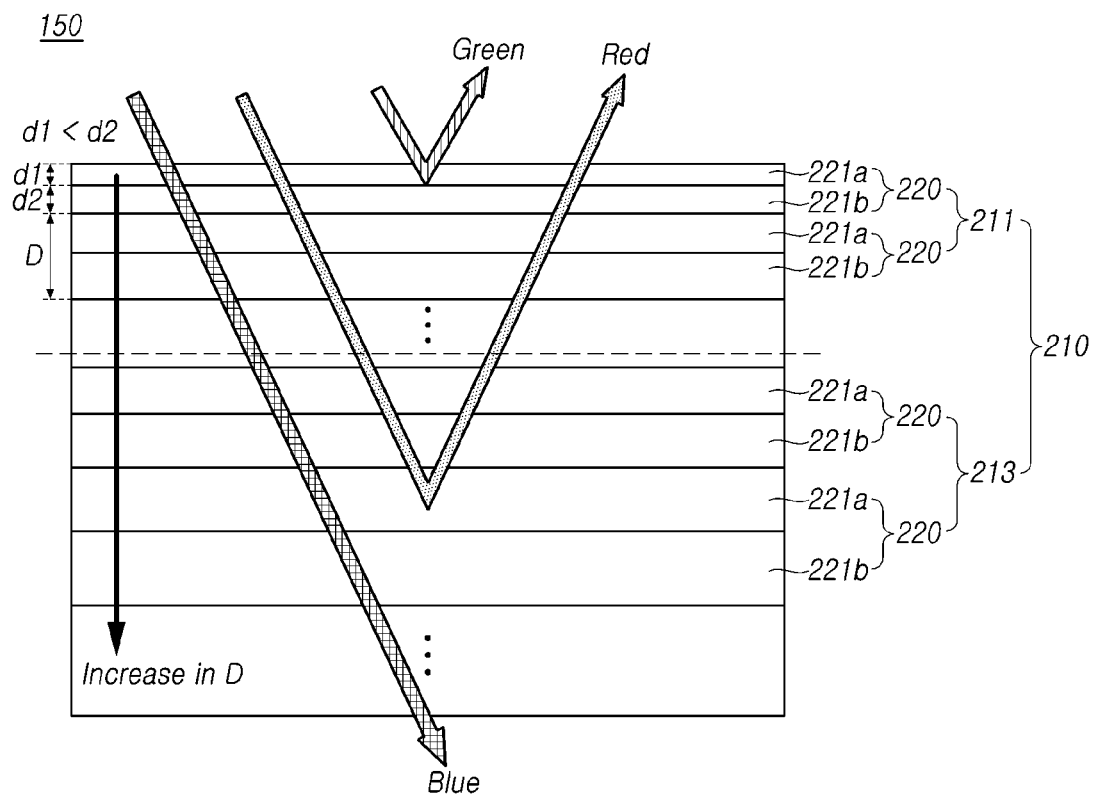
FIG. 4 is a schematic cross-sectional view illustrating another exemplary optical filter of the display device according to exemplary embodiments.
Figure 5:
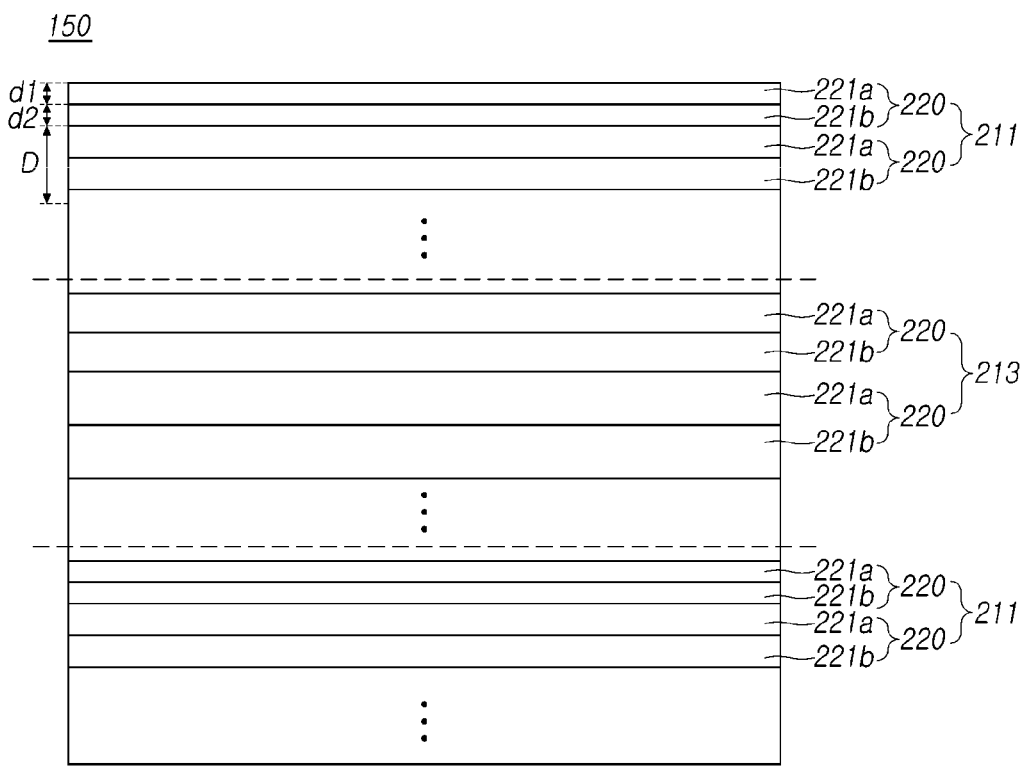
FIG. 5 is a schematic cross-sectional view illustrating another exemplary optical filter of the display device according to exemplary embodiments.
Figure 6:
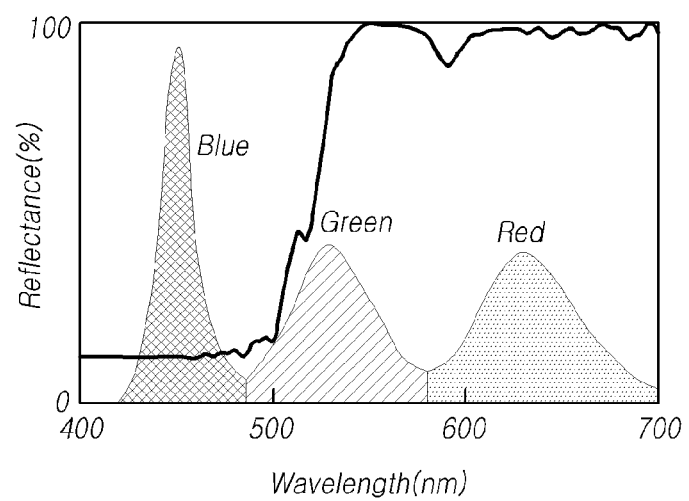
FIG. 6 is a graph illustrating optical properties of an optical filter of the display device according to exemplary embodiments.
Figure 7:
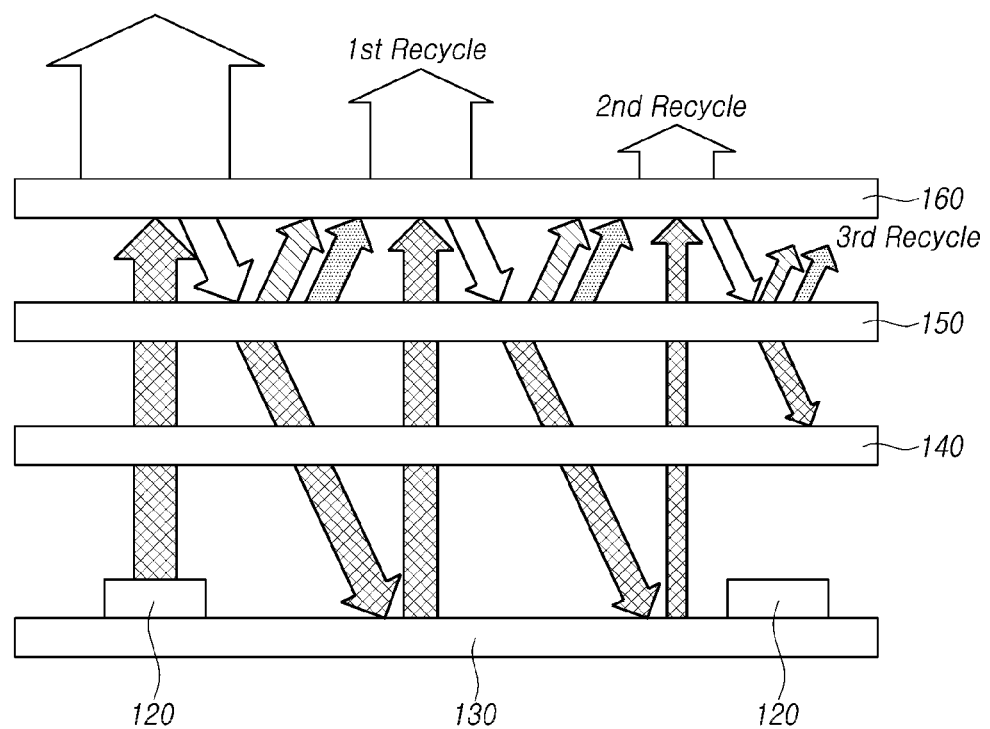
FIG. 7 is a schematic view illustrating the operating principle of the optical filter of the display device according to exemplary embodiments.
Figure 8:
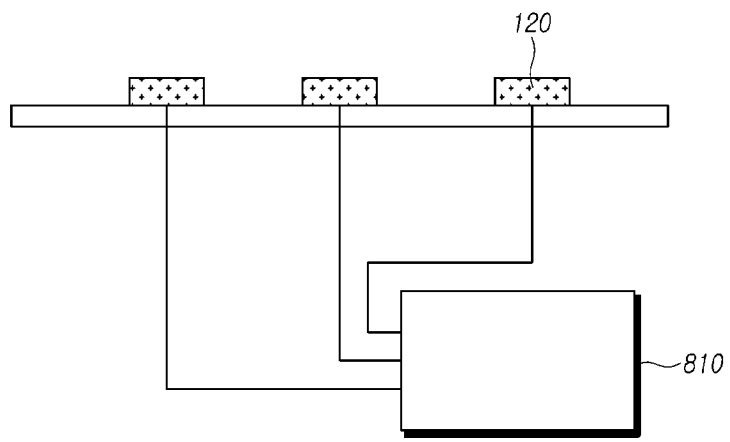
FIG. 8 is a schematic view illustrating the operating principle of the display device according to exemplary embodiments.
Figure 9:
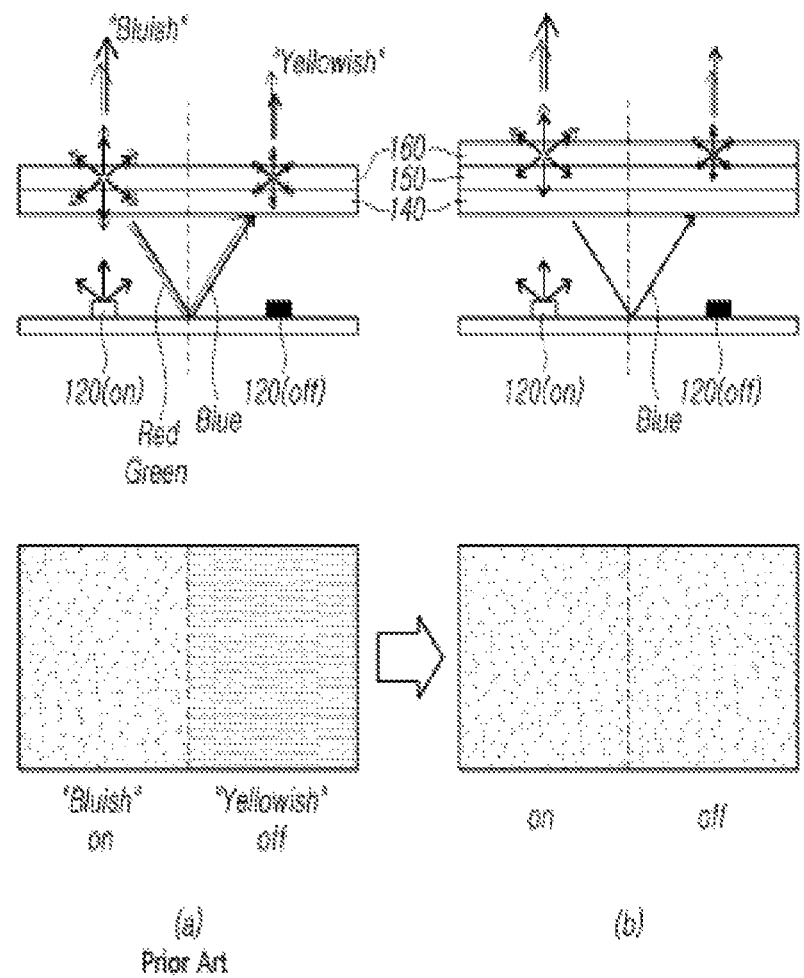
FIG. 9 is a schematic view illustrating effects of the display device according to exemplary embodiments.
Figure 10:
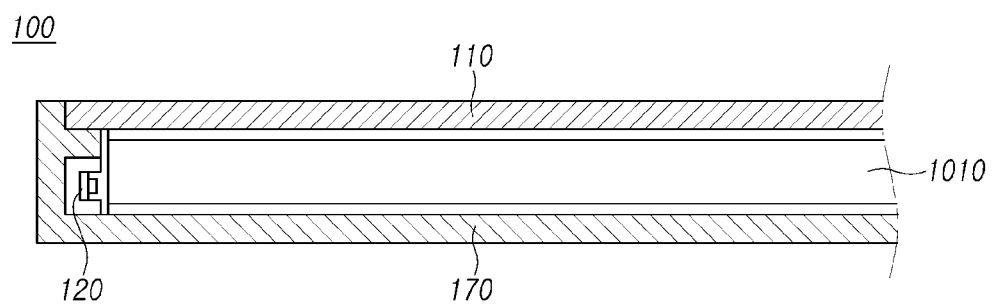
FIG. 10 is a cross-sectional view illustrating another display device according to exemplary embodiments.
Figure 11:
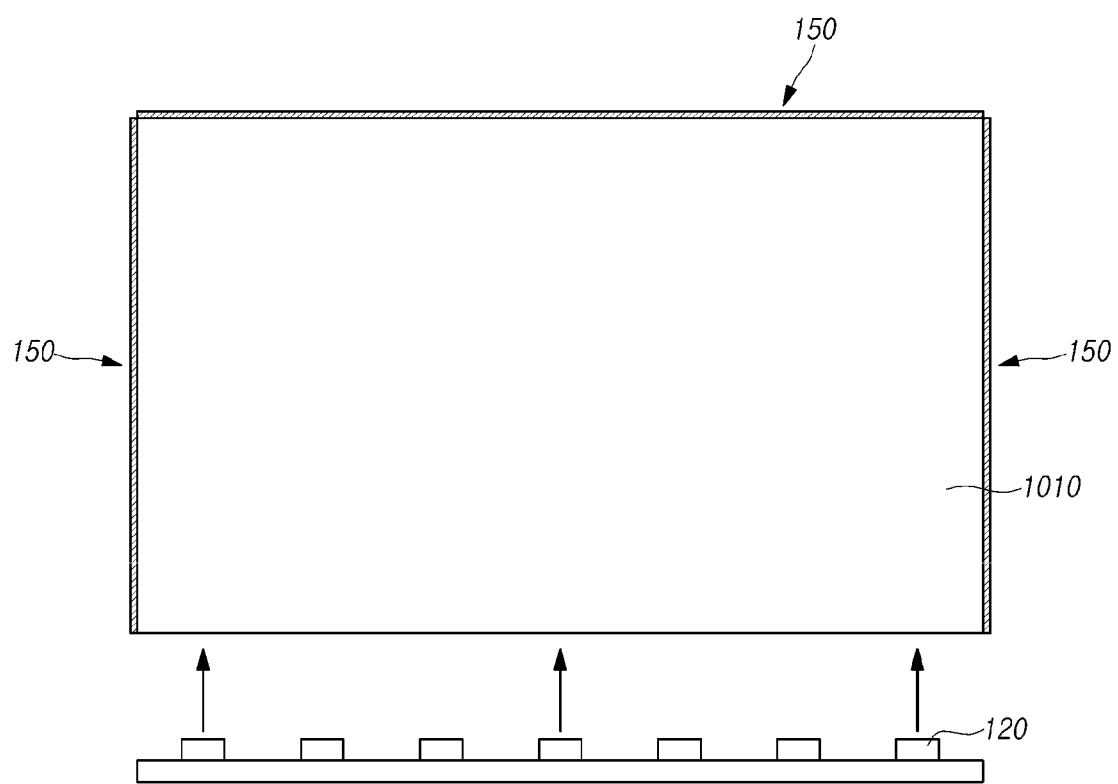
FIG. 11 is a schematic view illustrating an application of the optical filter of another display device according to exemplary embodiments.
Figure 12:
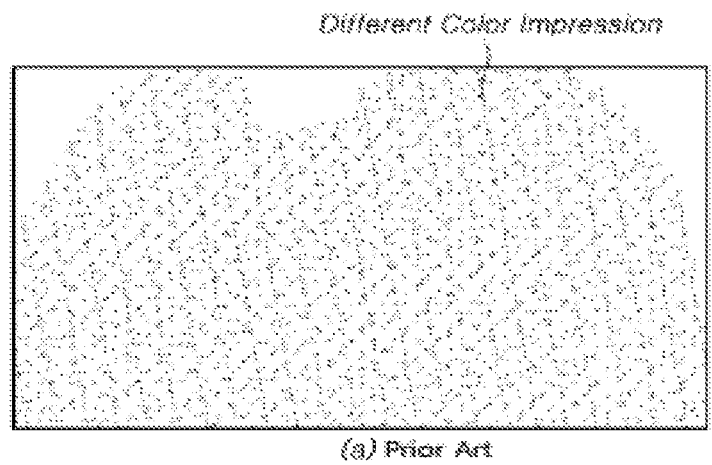
FIG. 12 is a schematic view illustrating effects of the display device according to exemplary embodiments.
Figure 12:
Figure 12:
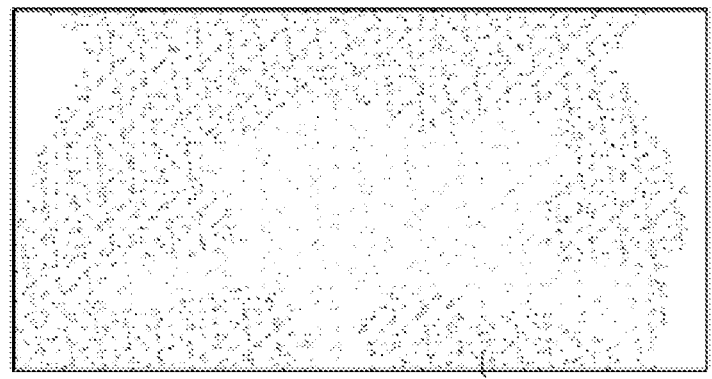

FIG. 1 is a cross-sectional view illustrating a display device according to exemplary embodiments, FIG. 2 is a schematic perspective view illustrating the optical filter of the display device according to exemplary embodiments, FIG. 3 is a schematic cross-sectional view illustrating an exemplary optical filter of the display device according to exemplary embodiments, FIG. 4 is a schematic cross-sectional view illustrating another exemplary optical filter of the display device according to exemplary embodiments, FIG. 5 is a schematic cross-sectional view illustrating another exemplary optical filter of the display device according to exemplary embodiments, FIG. 6 is a graph illustrating optical properties of an optical filter of the display device according to exemplary embodiments, FIG. 7 is a schematic view illustrating the operating principle of the optical filter of the display device according to exemplary embodiments, FIG. 8 is a schematic view illustrating the operating principle of the display device according to exemplary embodiments, FIG. 9 is a schematic view illustrating effects of the display device according to exemplary embodiments, FIG. 10 is a cross-sectional view illustrating another display device according to exemplary embodiments, FIG. 11 is a schematic view illustrating an application of the optical filter of another display device according to exemplary embodiments, and FIG. 12 is a schematic view illustrating effects of the display device according to exemplary embodiments.

Referring to FIG. 1, the display device 100 includes a display panel 110 and a backlight unit providing light to the display panel 110.

The display panel 110 may be selected from among a liquid crystal display (LCD) device, a plasma display panel (PDP) device, a field emission display (FED) device, and an organic light-emitting diode (OLED) display device.

Hereinafter, for the sake of brevity, reference will be made, by way of example, to an LCD device displaying an image by allowing light provided by a backlight unit to pass through the display panel 110 by adjusting the orientations of liquid crystals of a liquid crystal layer of the display panel 110 by controlling an electric field applied to the liquid crystal layer.

The display device 100 may include a cover bottom 170 disposed below the display panel 110 to protect the backlight unit, the cover bottom 170 generally being made of a metal, and a case top (not shown), or a chassis structure, protecting the front peripheral portions and the side portions of the display panel 110 by covering outer portions of the front peripheral and side portions.

Referring to the structure of the backlight unit, a plurality of light sources 120 are provided below the display panel 110.

The light sources 120 of the backlight unit, irradiating light to the display panel 110, may be a plurality of light-emitting diodes (LEDs).

The plurality of light sources 120 may be arranged according to the configuration of an edge-type backlight or the configuration of a direct backlight, depending on the display type of the display device 100.

When the display device 100 has a direct backlight structure or is a "direct display device," the plurality of light sources 120 may be mounted on a structure, such as the cover bottom 170 or a back cover. Hereinafter, for the sake of brevity, the direct display device 100 will be described first, and the display device 100 having an edge-type backlight structure (hereinafter, referred to as the "edge-type display device") will be described later with reference to FIG. 10.

A reflective layer 130 may be provided below the plurality of light sources 120 to improve the luminous efficiency of the plurality of light sources 120. That is, the plurality of light sources 120 may be located on the top surface of the reflective layer 130.

The reflective layer 130 acts to reflect incident light toward the display panel 110. The reflective layer 130 may reflect light according to one of various types of reflection, such as specular reflection and diffuse reflection.

In addition, a diffusion layer 140 may be provided above the plurality of light sources 120.

The diffusion layer 140 may made of a transparent material or a material having haze properties, including particles, a pattern, or the like. The diffusion layer 140 is a component acting to provide an overall area light source by refracting and diffusing light irradiated by the light sources 120. The diffusion layer 140 may include a light-diffusing agent, a pattern, or the like. When the diffusion layer 140 is imparted with haze properties, the diffusion layer 140 can uniformly diffuse light, irradiated by the light sources 120, when supplying light to the display panel 110.

The diffusion layer 140 may be a film or a plate, or may have a structure in which two or more films or plates are stacked on each other.

In addition, a pattern layer (not shown) may be provided below or above the diffusion layer 140 to prevent the plurality of light sources 120 from being directly recognized from the display panel 110.

In addition, an optical filter 150 may be provided on a path of light that has exited the plurality of light sources 120 toward the display panel 110, more particularly, above the diffusion layer 140.

The optical filter 150 will be described in detail with reference to FIGS. 2 to 5.

The optical filter 150 can perform an optical function of allowing light within a specific wavelength range, having exited the plurality of light sources 120, to pass therethrough while reflecting light within other wavelength ranges, having exited the plurality of light sources, than the specific wavelength.

Specifically, the optical filter 150 may include two or more filters 210.

Each of the filters 210 is included in the optical filter 150, as a unit of the optical filter 150, acting to reflect light within a specific wavelength range.

The filters 210 may include two or more filters, for example, a first filter 211 and a second filter 213. It should be understood, however, that the optical filter 150 may include more filters 210 than the first and second filters 211 and 213.

The first filter 211 can reflect light within a first wavelength range, having exited the plurality of light sources 120, light reflected from the plurality of light sources 120, or other light.

In addition, the second filter 213 can reflect light within a second wavelength range, different from the first wavelength range.

The first wavelength range and the second wavelength range refer to specific wavelength ranges within the visible light wavelength range, approximately 400 nm to 780 nm.

For example, the first wavelength range may be a range from about 490 nm to about 580 nm, in which light is recognized as being "green."

The second wavelength range may be a range from about 580 nm to about 780 nm, in which light is recognized as being "red."

In addition, a third wavelength range, within the visible light wavelength range, may be a range from about 420 nm to about 490 nm, in which light is recognized as being "blue."

In this case, the first filter 211 can reflect light within a wavelength range approximately from 490 nm to 580 nm, corresponding to green light, the second filter 213 can reflect light within wavelength range approximately from 580 nm to 780 nm. However, the present invention is not limited thereto, and the wavelength ranges of light that the first filter 211 and the second filter 213 reflect may vary in some cases.

The first filter 211 may reflect green light but transmit red light and blue light. The second filter 213 may reflect red light that was transmitted through the first filter 211 and transmit blue light.

Each of the filters 210 may include two or more filter elements 220.

Each of the filter elements 220 includes two or more polymer layers 221a and 221b having different refractive indices.

In each of the filter elements 220, the polymer layers 221a and 221b having different refractive indices can reflect a specific wavelength of light at the interface therebetween towards the display panel 110.

More specifically, each of the filter elements 220 can reflect light having a wavelength expressed by Formula 1.

$$\lambda = 2(n_1 d_1 + n_2 d_2) \qquad (1)$$

In Formula 1, λ indicates a wavelength of light to be reflected, n1 indicates a refractive index of the first polymer layer 221a among the two or more polymer layers 221a and 221b, d1 indicates a thickness of the first polymer layer 221a, n2 indicates a refractive index of the second polymer layer 221b among the two or more polymer layers 221a and 221b, and d2 indicates a thickness of the second polymer layer 221b. The first polymer layer 221a and the second polymer layer 221b are randomly defined to distinguish the two or more polymer layers 221a and 221b from each other.

Here, an optical thickness, i.e. a thickness of a transparent object indicated by an optical distance, in consideration of the refractive indices and thicknesses of the polymer layers 221a and 221b, may be indicated by "nd."

For example, when the first polymer layer 221a has a refractive index n1 and a thickness d1, the optical thickness thereof is n1d1. In addition, the optical thickness of the second polymer layer 221b is n2d2.

In this regard, according to Formula 1, the wavelength of light reflected from a filter element 220 is equal to twice the optical thickness of the filter element 220 obtained by adding the optical thickness of the first polymer layer 221a and the optical thickness of the second polymer layer 221b.

That is, the filter element 220, having an optical thickness of 200 nm, can reflect 400 nm wavelength light.

As described above, the filter element 220 can reflect light having a specific wavelength, depending on the refractive indices and thicknesses of the two or more polymer layers 221a and 221b of the filter element 220.

When the optical thickness of the filter element 220 is changed, the wavelength of light that the filter element 220 reflects is changed. Accordingly, when two or more filter elements 220 are combined, the filter 210 can reflect light within a specific wavelength range.

Since each of the filter elements 220 cannot reflect light unless light enters a sparse medium (or a low refractive index medium) from a dense medium (or a high refractive index medium), the refractive index of one of the polymer layers 221a and 221b of the filter element 220, which light strikes first, may be higher than the refractive index of the other of the polymer layers 221a and 221b of the filter element 220. For example, in the case in which light enters the filter element 220 through the first polymer layer 221a, the refractive index n1 of the first polymer layer 221a may be higher than the refractive index n2 of the second polymer layer 221b.

In addition, each of the filters 210 includes two or more filter elements 220, each of which includes two or more polymer layers 221a and 221b. Accordingly, the optical filter 150 may have an overall multilayer structure in which different polymer layers 221a and 221b are stacked on each other in an alternating manner.

Each of the polymer layers 221a and 221b of each of the filter elements 220 may be made of various types of polymers. For example, each of the polymer layers 221a and 221b may be made of one, or a combination of two or more, selected from among, but not limited to, polyethylene naphthalate (PEN), co-polyethylene naphthalate co-PEN), polyethylene terephthalate (PET), polyvinyl chloride (PVC), styrene acrylonitrile copolymer (SAN), ethylene vinyl acetate (EVA), polyamide (PA), polyacetal (POM), phenol epoxy (EP), urea (UF), polycarbonate (PC), polystyrene (PS), poly(inethyl methacrylate) (PMMA), polybutylene terephthalate (PBT), polypropylene (PP), polyethylene (PE), acrylonitrile butadiene styrene (ABS), polyurethane (PU), polyimide (PI), melanin (MF), unsaturated polyester (UP), silicon (SI), and cycloolefin polymer.

The refractive index n of each of the polymer layers 221a and 221b is a value based on the characteristics of the materials of the polymer layers 221a and 221b or substances contained in the polymer layers 221a and 221b. The material or thickness of each of the polymer layers 221a and 221b may be changed in order to vary the wavelength of light that the filter element 220 can reflect. Since changes in the materials of the polymer layers 221a and 221b are limited, due to limitations in selectable materials, the wavelength of light that the filter element 220 reflects may be easily adjusted by changing the thicknesses d of the polymer layers 221a and 221b.

When the thicknesses d of the polymer layers 221 are changed without changes in the materials of the polymer layers 221a and 221b, the optical thicknesses of the polymer layers 221a and 221b may be directly proportional to the thicknesses d of the polymer layers 221a and 221b.

The optical filter 150 includes two or more filters 210, each of which includes two or more filter elements 220, each of which includes two or more polymer layers 221a and 221b. Accordingly, the optical filter 150 includes a plurality of polymer layers 221a and 221b.

In this case, the two or more polymer layers 221a and 221b of each of the filter elements 220, included in the optical filter 150, may have the same thickness d.

For example, when a single filter element 220 includes two polymer layers 221a and 221b, the thickness d1 of the first polymer layer 221a and the thickness d2 of the second polymer layer 221b may be the same.

The thicknesses D of the filter elements 220, respectively obtained by adding the thickness d1 of the first polymer layer 221a and the thickness d2 of the second polymer layer 221b, may gradually increase in the direction of light entering the optical filter 150, as illustrated in FIG. 3.

In this case, unless the material of the first polymer layer 221a and the material of the second polymer layer 221b are changed, the optical thicknesses of the filter elements 220 gradually increase in the direction of light entering the optical filter 150, as illustrated in FIG. 3. Accordingly, the wavelength of light that the filter elements 220 can reflect may gradually increase.

In some cases, two or more polymer layers 221a and 221b of the filter element 220, included in the optical filter 150, may have different thicknesses d.

For example, when each of the filter elements 220 includes two polymer layers 221a and 221b, the thickness d1 of the first polymer layer 221a may differ from the thickness d2 of the second polymer layer 221b.

In addition, the thickness D of the filter element 220, obtained by adding the thickness d1 of the first polymer layer 221a and the thickness d2 of the second polymer layer 221b, may gradually increase in the direction of light entering the optical filter 150 towards the plurality of light sources 120, as illustrated in FIG. 4.

In this case, differently from FIG. 3, the first polymer layer 221a and the second polymer layer 221b of each of the filter elements 220 may have different thicknesses d1 and d2, and the optical thicknesses of the filter elements 220 may gradually increase in the direction of light entering the optical filter 150 towards the plurality of light sources 120, as illustrated in FIG. 4. Accordingly, the wavelength of light that the filter elements 220 can reflect may increase more continuously.

Unlike the foregoing descriptions, the filter elements 220 may be configured such that the thicknesses D thereof gradually decrease in the direction of light entering the optical filter 150.

Since the first filter 211 reflects light within the first wavelength range and the second filter 213 reflects light within the second wavelength range, an average optical thickness of the two or more filter elements 220 of the first filter 211 may differ from an average optical thickness of the two or more filter elements 220 of the second filter 213.

An average optical thickness obtained by averaging the optical thicknesses of the filter elements 220 of the first filter 211 may differ from an average optical thickness obtained by averaging the optical thicknesses of the filter elements 220 of the second filter 213.

In the case in which the first filter 211 reflects light within a visible wavelength range corresponding to green light and the second filter 213 reflects light within a visible wavelength range corresponding to red light, the visible light wavelength range corresponding to red (from 580 nm to 780 nm) is higher than the visible light wavelength range corresponding to green (from 490 nm to 580 nm). Thus, the average optical thickness of the two or more filter elements 220 of the second filter 213 may be higher than the average optical thickness of the two or more filter elements 220 of the first filter 211.

The filters 210 of the optical filter 150 may respectively be provided by stacking the first and second filters 211 and 213 in an alternating manner.

As illustrated in FIG. 5, two or more first filters 211 and a single second filter 213 or a single first filter 211 and two or more second filters 213 may be provided in an alternating manner to improve the reflectivity of the optical filter 150 for light within the first wavelength range or the second wavelength range.

As illustrated in FIG. 6, the optical filter 150 having one of the above-described structures has a property of allowing light within a specific wavelength range to pass therethrough while reflecting light within another wavelength range, due to low reflectivity for light within a specific wavelength range but high reflectivity for light within another wavelength range. FIG. 6 illustrates an optical filter 150 allowing blue light to pass therethrough, due to low reflectivity for light within the third wavelength range corresponding to blue light, while reflecting green light and red light, due to high reflectivity for light within the first wavelength range corresponding to green light and the second wavelength range corresponding to red light.

A color conversion layer 160 may be provided above the optical filter 150. That is, the color conversion layer 160 may be located above the diffusion layer 140 and the optical filter 150.

When the display device 100 is provided with the color conversion layer 160, the optical filter 150 may be provided between the diffusion layer 140 and the color conversion layer 160.

The color conversion layer 160 may perform color conversion by containing a phosphor that can absorb light within a specific wavelength range (or light having a specific color) to emit light within a wavelength range different from the specific wavelength range.

For example, the optical filter 150 may reflect light within the first wavelength range corresponding to green light and light within the second wavelength range corresponding to red light.

In the display device 100 including the optical filter 150, the plurality of light sources 120 may be blue light-emitting diodes (LEDs) emitting light within the third wavelength range corresponding to blue light.

In this case, the color conversion layer 160 may contain a phosphor converting light within the third wavelength range into white light.

That is, the color conversion layer 160 may contain a green phosphor that absorbs light within the third wavelength range corresponding to blue light to emit light within the first wavelength range corresponding to green light and a red phosphor that absorbs light within the third wavelength range corresponding to blue light to emit light within the second wavelength range corresponding to red light.

The green phosphor may contain at least one selected from among, but not limited to, $(Sr,Ba,Mg)_2SiO_4$:Eu, $Al_5Lu_3O_{12}$:Ce, $Y_3Al_5O_{12}$:Ce, $La_3Si_6N_{11}$:Ce, $(Sr,Ba,Eu)_2SiO_4$:Eu, β-SiAlON:$Si_{6-z}Al_zO_zN_{8-z}$EU, $Lu_3Al_5O_{12}$:Ce, and $(Lu,Gd)_3Al_5O_{12}$:Ce. In addition, the green phosphor may include a material having the composition of at least one selected from among other types of materials, such as but not limited to, garnets, silicates, sulfides, and oxynitrides.

The red phosphor may contain at least one selected from among, but not limited to, $(Sr,Ba,Mg)_3SiO_5$:Eu, $(Sr,Ca)AlSiN_3$:Eu, $CaAlSiN_3$:Eu, $MSi_{1-z}Al_zO_zN_{2-z}$:Eu, α-Sialon: $Ca_xEu_y(Si,Al)_{12}(O,N)_{16}$, CaAlSiN, $(Sr,Ca)AlSiN_3$:Eu, and $K_2Si_{1-x}F_6$:$Mn_x$. In addition, the green phosphor may include a material having the composition of at least one selected from among other types of materials, such as but not limited to, garnets, nitrides, sulfides, oxynitrides, and nitrides.

The green phosphor and the red phosphor may emit green light and red light, which are in turn mixed with blue light emitted by the plurality of light sources 120, so that the color conversion layer 160 emits white light.

Alternatively, the color conversion layer 160 may include quantum dots or a nano-organic material, in place of the above-described phosphor, to emit green light and red light.

The optical filter 150 provided between the diffusion layer 140 and the color conversion layer 160 may act to improve the luminous efficiency of light emitted by the plurality of light sources 120.

Described in more detail with reference to FIG. 7, in the case in which the plurality of light sources 120 are blue LEDs to emit light within the third wavelength range corresponding to blue light, emitted light passes through the optical filter 150 after passing through the diffusion layer 140.

This is because light within the third wavelength range can pass through the optical filter 150, which only reflects light within the first wavelength range and light within the second wavelength range.

Light having passed through the optical filter is absorbed to green and red phosphors contained in the color conversion layer 160, which in turn emits green light and red light, so that white light can be provided to the display panel 110.

Here, green light and red light, emitted by the color conversion layer 160, may be emitted in other directions than the direction of the display panel 110, and blue light, which is not converted into green light or red light, may be emitted in other directions than the direction of the display panel 110.

White light is obtained by the mixture of green light, red light, and blue light, which are not directed toward the display panel 110. While such white light is passing through the optical filter 150, green light within the first wavelength range and red light within the second wavelength range are reflected in the direction of the display panel 110, and blue light within the third wavelength range passes through the optical filter 150.

Blue light, having passed through the optical filter 150, is reflected from the reflective layer 130 and re-passes through the optical filter 150 to be mixed with green light and red light reflected from the optical filter 150, thereby providing white light to the display panel 110.

The above-described process may be repeated a plurality of times, such that light emitted by each of the plurality of light sources 120 is reused by repeated reflection, thereby improving the luminous efficiency of the plurality of light sources 120.

The display device 100 may include a light source driving circuit 810 driving the light sources 120. The light source driving circuit 810 may separately drive the plurality of light sources 120.

The light source driving circuit 810 controls driving voltages and driving currents, depending on currents flowing through blocks of the plurality of light sources 120.

The light source driving circuit 810 may generate control signals having a duty ratio of 0% to 100%, in response to a plurality of dimming signals from a timing controller (not shown), and may separately control the plurality of light sources 120 using the generated control signals.

The plurality of light sources 120 may be grouped into light source blocks (not shown) respectively including two or more light sources 120. The plurality of light sources 120, grouped into the light source blocks, may be driven by control signals generated by the light source driving circuit 810 in a block-specific manner.

Control signals are signals for adjusting on/off times of the plurality of light sources 120 of the light source blocks. The control signals may be pulse width modulation (PWM) signals, in which on times of the plurality of light sources 120 and amounts of current flowing through the plurality of light sources 120 may be adjusted depending on the duty ratios of the control signals.

For example, some light sources 120 controlled by control signals having a larger duty ratio may emit light for a relatively longer period of time, while other light sources 120 controlled by control signals having a smaller duty ratio may emit light for a relatively shorter period of time.

The duty ratios of the control signals may be determined by dimming signals received from the timing controller.

When the plurality of light sources 120 are separately driven in the configuration in which the optical filter 150 is located between the diffusion layer 140 and the color conversion layer 160, the luminous efficiency of the plurality of light sources 120 can be improved, thereby reducing different color impressions on the display panel 110.

More specifically, referring to part (a) in FIG. 9, in the display device 100 in which the plurality of light sources 120 are separately driven (i.e. turned on and off), an area in which light sources 120 are turned on and an area in which light sources 120 are turned off have different color impressions.

This is because, when green light and red light are emitted by the color conversion layer 160, located above the plurality of light sources 120, portions of such green and red light, which have not entered the display panel 110, are reflected from the reflective layer 130 to enter the area in which the turned-off light sources 120 are located.

While the ratio of blue light directly entering the display panel 110 from the light sources 120 is relatively high in the area in which the light sources 120 are turned on, the ratio of blue light directly entering the display panel 110 from the light sources 120 is relatively low in the area in which the light sources 120 are turned. Consequently, white light in the area in which the light sources 120 are turned on is more bluish, while white light in the area in which the light sources 120 are turned off is more yellowish.

In contrast, referring to part (b) in FIG. 9, the optical filter 150, located between the diffusion layer 140 and the color conversion layer 160, can reduce green light and red light entering the area in which the light sources 120 are turned off. Accordingly, this can reduce the difference in color impression between the area in which the light sources 120 are turned on and the area in which the light sources 120 are turned off while only creating the difference in luminance between such areas.

An optical layer 180 as shown in FIG. 1 may be provided above the color conversion layer 160.

The optical layer 180 may include a plurality of films or plates stacked on one another. For example, the optical layer 180 may be selected from among, but is not limited to, a diffusion film, a prism film, and a dual bright enhancement film (DBEF).

The display device 100 may be an edge-type backlight display device, as illustrated in FIG. 10.

In this case, the plurality of light sources 120 of the display device 100 may be located adjacent to one surface of a light guide plate 1010, i.e. an incidence surface of the light guide plate 1010, to irradiate light to the incidence surface of the light guide plate 1010.

In addition, the plurality of light sources 120 of the edge-type display device 100 may emit white light in which first wavelength range light, second wavelength range light, third wavelength range light are mixed. In this case, each of the plurality of light sources 120 may be provided as an LED package. The LED package, providing each light source 120, may include a blue LED and a phosphor layer converting blue light, emitted by the blue LED, into green light and red light.

When the plurality of light sources 120 of the edge-type display device 100 emit white light, due to different color impressions of the plurality of light sources 120, the thickness of the light guide plate 1010, the characteristics of a reflecting pattern of the light guide plate 1010, and the like, more bluish white light and more yellowish white light may strike different locations on the display panel 110, thereby generating different color impressions on the display panel 110.

To remove different color impressions in white light, the optical filter 150 having the above-described structure may be used in the light guide plate 1010.

More specifically, as illustrated in FIG. 11, the optical filter 150 may be provided on the remaining surfaces of the light guide plate 1010, except for the incidence surface. That is, the optical filter 150 may be provided on the left surface, the right surface, and the surface opposite to the incidence surface in order to reduce different color impressions on the display panel 110.

When the optical filter 150, reflecting green light within the first wavelength range and red light within the second wavelength range while allowing blue light within the third wavelength range to pass therethrough, are used in the light guide plate 1010, the ratio of more bluish white light entering the display panel 110 can be reduced, thereby reducing overall different color impressions occurring on specific regions of the display panel 110.

Referring to part (a) in FIG. 12, when reflecting films or the like are attached to surfaces of the light guide plate 1010 as in the related art, the reflecting film having a simple function of reflecting light fails to reduce a difference in color impressions in white light, and different color impressions are recognized from the entire area of the display panel 110.

In contrast, referring to part (b) in FIG. 12, when the optical filter 150 is attached to surfaces of the light guide plate 1010, a blue light component of bluish white light, in bluish light and yellowish light having different color impressions, can pass through the optical filter 150, thereby reducing overall different color impressions in white light.

As set forth above, in the backlight unit and the display device according to exemplary embodiments, display performance can be improved by removing or reducing different color impressions from an image displayed on the display panel.

In addition, the backlight unit and the display device according to exemplary embodiments, display performance can be improved by improving the luminance uniformity of the display panel.

Furthermore, the backlight unit and the display device according to exemplary embodiments, an effect on display performance, caused by degradations in uniform color impression due to characteristics of light sources or a backlight structure, can be prevented or reduced.

Although all of the components constituting exemplary embodiments have been described as being combined together or as operating in concert with each other, the present disclosure is not necessarily limited thereto. Rather, one or more components may be selected from the entire components to be combined together and operate in a combined form within the scope of the present disclosure.

It will be understood that the terms "comprise," "include," "have," and any variations thereof used herein are intended to cover non-exclusive inclusions unless explicitly described to the contrary. Unless otherwise specified, all terms including technical and scientific terms used herein have the same meaning as commonly understood by a person skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A backlight unit comprising:
a plurality of light sources;
a reflective layer above which the plurality of light sources are provided;
a diffusion layer provided above the plurality of light sources;
a color conversion layer provided above the diffusion layer; and
an optical filter provided on a path of light from the plurality of light sources, the optical filter allowing light within a specific wavelength range to pass through while reflecting light within other wavelength ranges, the optical filter located between the diffusion layer and the color conversion layer,
wherein the optical filter comprises two or more filters, each of the two or more filters comprising two or more filter elements, each of the two or more filter elements comprising two or more polymer layers having different refractive indices,
the two or more filters include a first filter reflecting light within a first wavelength range and a second filter reflecting light within a second wavelength range, the first filter and the second filter both configured to transmit light within a third wavelength range, and
the color conversion layer is located between the optical filter and a display panel and converts light within the third wavelength range to white light that is transmitted via the optical filter.

2. The backlight unit according to claim 1, wherein the optical filter is configured such that the two or more polymer layers of each of the two or more filter elements have same thicknesses, and
thicknesses of the two or more filter elements gradually increase in a direction towards the plurality of light sources.

3. The backlight unit according to claim 1, wherein the optical filter is configured such that the two or more polymer layers of each of the two or more filter elements have different thicknesses, and
thicknesses of the two or more filter elements gradually increase in a direction towards the plurality of light sources.

4. The backlight unit according to claim 1, wherein the optical filter is configured such that an average optical thickness of the first filter is different from an average optical thickness of the two or more filter elements of the second filter.

5. The backlight unit according to claim 4, wherein the optical filter comprises multiple layers of the first filter and multiple layers of the second filter stacked in an alternating manner.

6. The backlight unit according to claim 1, wherein the first wavelength range, the second wavelength range, and the third wavelength range are included in a visible light wavelength range, and
the plurality of light sources emit light within the third wavelength range.

7. The backlight unit according to claim 6, wherein the first wavelength range is a wavelength range corresponding to green light,
the second wavelength range is a wavelength range corresponding to red light, and
the third wavelength range is a wavelength range corresponding to blue light.

8. The backlight unit according to claim 1, further comprising an optical layer provided above the color conversion layer.

9. The backlight unit according to claim 1, further comprising a light guide plate having an incidence surface adjacent to the plurality of light sources, wherein the optical filter is located on each of remaining surfaces of the light guide plate, except for the incidence surface.

10. The backlight unit according to claim 9, wherein the first wavelength range, the second wavelength range, and the third wavelength range are included in a visible light wavelength range, and
the plurality of light sources emit white light.

11. The backlight unit according to claim 10, wherein the first wavelength range is a wavelength range corresponding to green light,
the second wavelength range is a wavelength range corresponding to red light, and
the third wavelength range is a wavelength range corresponding to blue light.

12. A display device comprising:
a display panel;
a color conversion layer; and
a backlight unit providing light to the display panel, wherein the backlight unit comprises:
a plurality of light sources; and
an optical filter provided on a path of light from the plurality of light sources, the optical filter allowing light within a specific wavelength range to pass through while reflecting light within other wavelength ranges,
wherein the optical filter comprises two or more filters, each of the two or more filters comprising two or more filter elements, each of the two or more filter elements comprising two or more polymer layers having different refractive indices,
the two or more filters include a first filter reflecting light within a first wavelength range and a second filter reflecting light within a second wavelength range,
the color conversion layer is located between the optical filter and the display panel, the color conversion layer converting light within a third wavelength range to white light that is transmitted via the optical filter, and the light within the second wavelength range passes through the first filter of the optical filter before being reflected by the second filter of the optical filter.

13. The display device according to claim 12, wherein the backlight unit further comprises:
a reflective layer above which the plurality of light sources are provided;
a diffusion layer provided above the plurality of light sources; and
the optical filter located between the diffusion layer and the color conversion layer.

14. The display device according to claim 13, wherein the first wavelength range, the second wavelength range, and the third wavelength range are included in a visible light wavelength range, and
the plurality of light sources emit light within the third wavelength range.

15. The display device according to claim 14, wherein the first wavelength range is a wavelength range corresponding to green light,
the second wavelength range is a wavelength range corresponding to red light, and
the third wavelength range is a wavelength range corresponding to blue light.

16. The display device according to claim 12, further comprising a driving circuit driving the plurality of light sources,
wherein the plurality of light sources are driven separately.

17. A display device comprising:
a display panel;
a color conversion layer; and
a backlight unit providing light toward the display panel, wherein the backlight unit comprises:
a plurality of light sources; and
an optical filter provided on a path of light from the plurality of light sources, the optical filter including at least a first filter and a second filter each including at least four polymer layers,
wherein the first filter is configured to reflect light within a first wavelength range toward the display panel and the second filter is configured to reflect light within a second wavelength range towards the display panel, the first filter and the second filter both configured to transmit light within a third wavelength range away from the display panel,
the color conversion layer is located between the optical filter and the display panel, the color conversion layer converting light within the third wavelength range to white light that is transmitted via the optical filter, and
the light within the second wavelength range passes through the first filter of the optical filter before being reflected by the second filter of the optical filter.

18. The display device of claim 17, wherein a refractive index of each of the at least four polymer layers is different from a refractive index of an adjacent layer of the at least four polymer layers.

19. The display device of claim 17, wherein the first wavelength range is a wavelength range corresponding to green light,
the second wavelength range is a wavelength range corresponding to red light, and
the third wavelength range is a wavelength rage corresponding to blue light.

20. The display device of claim 17, wherein the plurality of light sources emit light within the third wavelength range.

* * * * *